United States Patent [19]
Junkers

[11] Patent Number: 5,622,465
[45] Date of Patent: Apr. 22, 1997

[54] LOCK NUT

[76] Inventor: J. K. Junkers, 7 Arrowhead La., Saddle River, N.J. 07540

[21] Appl. No.: 638,635

[22] Filed: Apr. 26, 1996

[51] Int. Cl.[6] .............................. F16B 37/08; F16B 27/00
[52] U.S. Cl. .......................... 411/432; 411/223; 411/917
[58] Field of Search .................................... 411/222, 223, 411/224, 432, 433, 916, 917

[56] References Cited

U.S. PATENT DOCUMENTS

| | | | |
|---|---|---|---|
| 5,137,408 | 8/1992 | Junkers | 411/432 |
| 5,152,649 | 10/1992 | Popp | 411/917 X |
| 5,253,967 | 10/1993 | Organ et al. | 411/917 X |
| 5,318,397 | 6/1994 | Junkers | 411/432 |
| 5,538,379 | 7/1996 | Junkers | 411/432 |
| 5,539,970 | 7/1996 | Junkers | 411/432 X |

*Primary Examiner*—Neill R. Wilson
*Attorney, Agent, or Firm*—Michael J. Striker

[57] ABSTRACT

A lock nut to connect a joint having a threaded connector has a first nut member engagable with the threaded connector and axially displaceable, a second nut member engagable with the first nut member and turnable about an axis, a third nut member which is non-rotatably but axially displaceably connected with the first nut member and has a first substantially smooth surface over which the second nut member moves during rotation and another substantially rough surface which is embedable into a surface of the joint, and a locking element to achieve non-rotatability of the nut members. When the second nut member is turned about the axis against the smooth surface of the washer, the first nut member is displaced axially to apply a load to the threaded connector, while the rough surface of the third nut member embeds into the surface of the joint. When the lock nut is sufficiently tightened, the locking element eliminates the rotation of the second nut member.

8 Claims, 2 Drawing Sheets

LOCK NUT

BACKGROUND OF THE INVENTION

The present invention generally relates to a lock nut.

Lock nuts are known in the art and widely utilized in industry. Some lock nuts require a firm connection of the nut with a bolt. Other lock nuts require a firm connection with a flange in which the bolt is screwed. There are also lock nuts that are provided with two-piece washer slidable in one direction relative to one another and provided with rippled surfaces to abut against the flange surface on one side and against the nut bearing surface on the other side. The above mentioned lock nuts can be further improved.

SUMMARY OF THE INVENTION

Accordingly, it is an object of the present invention to provide a lock nut which is a further improvement of existing lock nuts.

In keeping with these objects and with others which will become apparent hereinafter, one feature of the parent invention resides, briefly stated, in a lock nut to connect a joint having a threaded connector, comprising a first nut member which is engagable with the threaded connector and is axially displaceable, a second nut member which is engageable with the first nut member and is rotatable about an axis, a third nut member which is connected non-rotatably but axially displaceably with the first nut member and which has one substantially smooth surface over which the second nut member moves during rotation and another substantially rough surface which is embedable into a surface of the joint, and locking means to achieve non-rotatability between the nut members so that when the second nut member is turned about the axis against the smooth surface of the third nut member, the first nut member is displaced axially to a apply a load to the threaded connector while the rough surface of the third nut member embeds into the surface of the joint, and when the lock nut is sufficiently tightened, the locking means eliminates rotation of the second nut member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
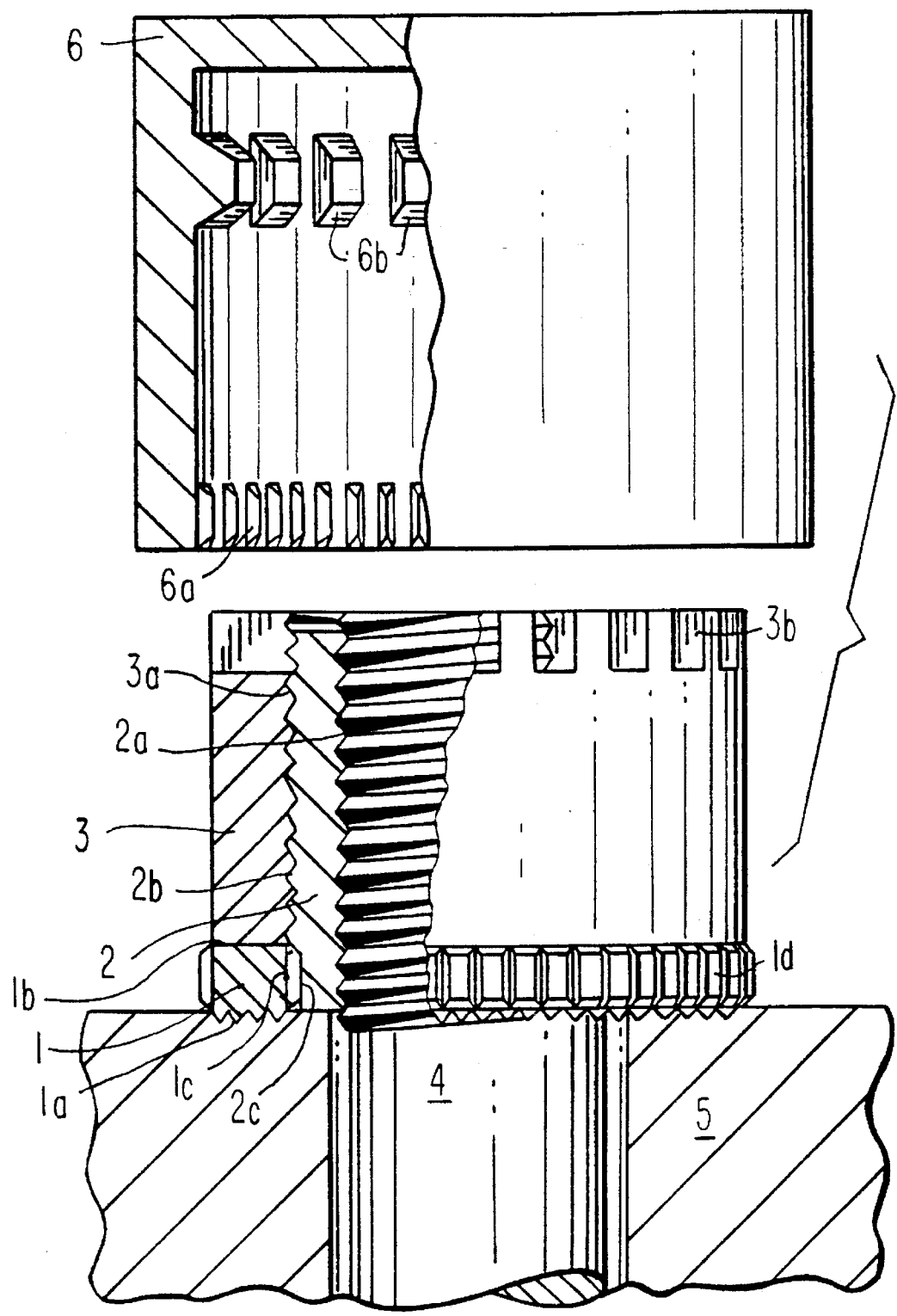
FIG. 1 is a view schmetically showing a lock nut in accordance with one embodiment of the present invention.

A lock nut in accordance with a first embodiment shown in FIG. 1 has a third nut member, a washer, which is identified as a whole with reference numeral 1. The third nut member 1 is ring shaped and has a lower surface 1a which is substantially rough and an upper surface 1b which is substantially smooth. The surfaces 1a and 1b are spaced from one another in an axial direction. The third nut member further has a polygonal inner surface formed for example by a plurality of inner splines 1c and a polygonal outer surface formed for example by, plurality of outer splines 1d. The splines 1c, 1d extend in an axial direction and are spaced for one another in a circumferential direction. The rough surface 1a of the third nut member, 1 can be made in many different ways, for example by a plurality of ripples.

The lock nut further has a first nut member identified as a whole with reference numeral 2. The first nut member 2 is formed as a sleeve. It has inner thread means 2a engagable with outer thread means of a threaded connector of a joint, for example a bolt 4. It further has outer thread means 2b. Furthermore, it is provided with a polygonal formation 2c which is engagable with the polygonal formation 1c of the third nut member 1, so that the third nut member 1 and the first nut member 2 are connected with one another non-rotatably, but displaceably in an axial direction relative to one another. The polygonal formation 2c can be formed by a plurality of splines which extend in an axial direction and are spaced for one another in a circumferential direction.

The lock nut further has a second nut member which is identified as a whole with reference numeral 3. The second nut member is formed as a sleeve. It has inner thread means 3a which is engagable with the outer thread means 2b of the inner nut member 2. It further has a locking means 3b which can be formed by a plurality of castellations extending in an axial direction and spaced for one another in a circumferential direction.

The lock nut also has a locking element which is identified as a whole with reference numeral 6. The locking element 6 is formed as a socket and is provided with two groups of additional locking means. The locking means of the first group is formed as a polygonal formation including a plurality of inner splines 6a which extend in an axial direction and are spaced for one another in a circumferential direction. The locking means of the second group include a polygonal formation formed by a plurality of inner teeth 6b which are spaced for one another in a circumferential direction.

The lock nut in accordance with the present invention operates in the following manner:

The lock nut including the first nut member, the second nut member and the third nut member is applied onto the threaded connector, particularly onto the bolt 4, by screwing the first nut member 2 onto the bolt 4. Then, the castellations 3b of the second nut member 3 are engaged by a tool, and the second nut member is turned around the axis. During turning of the second nut member 3, it slides with it lower surface against the smooth surface 1b of the third nut member 1, the first nut member 2 is displaced axially upwardly and tightens the bolt 4, the lower rough surface 1a of the third nut member embeds in the upper surface of the other part of the joint, in particularly a flange 5, and the third nut member 1 together with the first nut member 2 can not turn during this process. When the lock nut is sufficiently tightened, the tool is disengaged and the locking element 6 is fitted over the nut members 1, 2, 3 so that the teeth 6b of the locking element 6 engage with the castellations 3b of the second nut member 3, and the splines 6a of the locking element 6 engage with the splines 1d of the third nut member 1. As a result, all parts of the lock nut become non-rotatably connected with one another, and the lock nut can not turn relative to flange 5.

Figure 2:
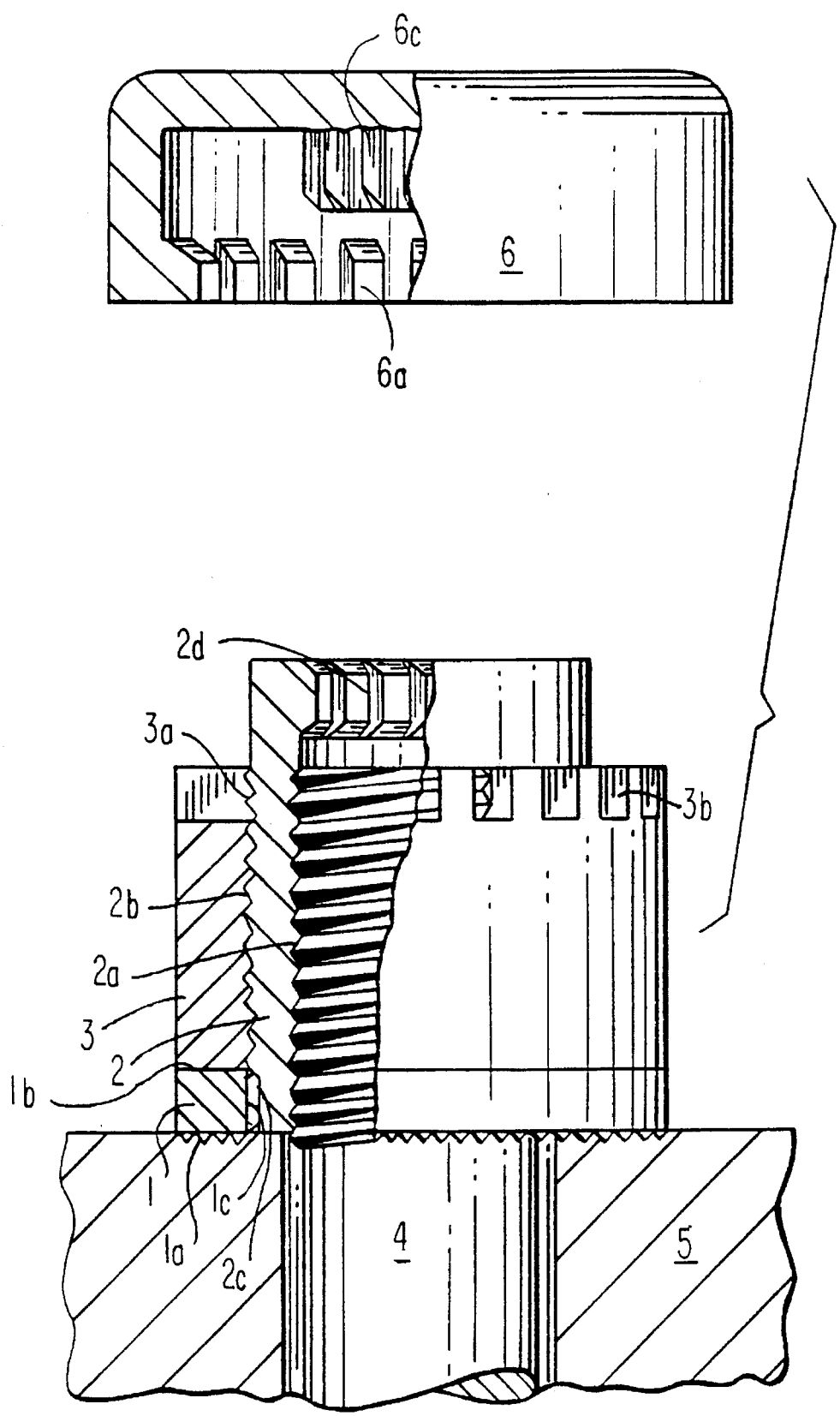
FIG. 2 is a view showing a lock nut in accordance with another embodiment of the present invention.

FIG. 2 shows a lock nut in accordance with a second embodiment of the present invention. The lock nut of the second embodiment substantially corresponds to the lock nut of the first embodiment; however the locking means of the lock nut of the embodiment shown in FIG. 2 are formed differently. The third nut member 1 is no longer provided with the outer splines. Instead, the first nut member 2 is provided with an inner polygonal formation formed by plurality of inner splines 2d which extend in an axial direction and are spaced from one another in a circumferential direction.

The locking element 6 has a plurality of outer splines 6c which extend in an axial direction and are spaced for one another in a circumferential direction. The locking element 6 is also provided with a plurality of inner castellations 6d which are spaced from one another in a circumferential direction.

When the lock nut shown in FIG. 2 is sufficiently tightened, similarly to the lock nut shown in FIG. 1, and the locking element 6 is fitted onto the other parts of the lock nut, the outer splines 6c of the locking element 6 engage with the inner splines 2d of the first nut member 2, while the castellations 6d of the locking element 6 engage with the castellations 3b of the second nut member 3. As a result, the first and the second nut members become non-rotatably connected with one another, and therefore the lock nut becomes immovable relative to the flange 5.

It will be understood that each of the elements described above, or two or more together, may also find a useful application in other types of constructions differing from the types described above.

While the invention has been illustrated and described as embodied in a lock nut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A lock nut to connect a joint having a threaded connector, comprising a first nut member which is engagable with the threaded connector and is axially displaceable; a second nut member which is engagable with said first nut member and is rotatable about an axis; a third nut member which is non-rotatably but axially displaceably connected with said first nut member and has one substantially smooth surface over which said second nut member moves during rotation and another substantially rough surface which is embedable into a surface of the joint; and locking means to achieve non-rotatability between said nut members, so that when said second nut member is rotated about the axis against said smooth surface of said third nut member, said first nut member is displaced axially to apply a load to the the threaded connector, while the rough surface of said third nut member embeds into the surface of the joint, and when the lock nut is sufficiently tightened, the locking means eliminates rotation of said second nut member.

2. A lock nut as defined in claim 1, wherein said first nut member is formed as an inner sleeve, while said second nut member is formed as an outer sleeve surrounding said inner sleeve.

3. A lock nut as defined in claim 1, wherein said rough surface of said third nut member is provided with a plurality of ripples.

4. A lock nut as defined in claim 1, wherein said third nut member has an inner polygonal formation, said first nut member having an outer polygonal formation non-rotatably and axially displaceably engaging said inner polygonal formation of said third nut member.

5. A lock nut as defined in claim 4, wherein said polygonal formations are formed as splines.

6. A lock nut as defined in claim 1, wherein said first nut member has inner thread means engagable with outer thread means of the threaded connector and also has outer thread means, said second nut member having inner thread means engaging said outer thread means of said first nut member.

7. A lock nut as defined in claim 1, wherein said third nut member has first locking means and said second nut member has second locking means, said locking element being provided with additional locking means which are engagable with said first and second locking means to prevent turning of said second nut member relative to said third nut member and therefore also relative to said first nut member.

8. A lock nut as defined in claim 1, wherein said first nut member has first locking means and said second nut member has second locking means, said locking element being provided with additional locking means which are engagable with said first and second locking means to prevent turning of said first nut member and said second nut member relative to one another.

* * * * *